(12) United States Patent
Zhang et al.

(10) Patent No.: US 11,706,533 B2
(45) Date of Patent: Jul. 18, 2023

(54) CONTROL METHOD FOR IMAGE ACQUISITION DEVICE, CONTROL DEVICE THEREFOR, AND STORAGE MEDIUM

(71) Applicant: Beijing Tusen Weilai Technology Co., Ltd., Beijing (CN)

(72) Inventors: Yu Zhang, Beijing (CN); Jianan Hao, Beijing (CN)

(73) Assignee: BEIJING TUSEN WEILAI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/395,655

(22) Filed: Aug. 6, 2021

(65) Prior Publication Data
US 2022/0046160 A1    Feb. 10, 2022

(30) Foreign Application Priority Data
Aug. 7, 2020   (CN) .......................... 202010787944.3

(51) Int. Cl.
*H04N 23/73* (2023.01)
*H04N 23/71* (2023.01)
*H04N 23/76* (2023.01)

(52) U.S. Cl.
CPC ............ *H04N 23/73* (2023.01); *H04N 23/71* (2023.01); *H04N 23/76* (2023.01)

(58) Field of Classification Search
CPC .... H04N 5/2353; H04N 5/2351; H04N 5/243; H04N 5/232; H04N 5/2258; H04N 5/247;
(Continued)

(56) References Cited

U.S. PATENT DOCUMENTS

| 2011/0007215 A1* | 1/2011 | Hori | G09G 5/005 348/E5.009 |
| 2015/0256720 A1* | 9/2015 | Yakay | H04N 21/43072 348/522 |

(Continued)

FOREIGN PATENT DOCUMENTS

| CN | 102438117 A | 5/2012 |
| CN | 102651799 A | 8/2012 |

(Continued)

OTHER PUBLICATIONS

Anonymous: "adjtime(3)—Linux manual page", pp. 1-3, Apr. 30, 2020.

(Continued)

*Primary Examiner* — Jason A Flohre
(74) *Attorney, Agent, or Firm* — Paul Liu; Julie J. Muyco; Perkins Coie, LLP

(57) ABSTRACT

Embodiments of the present invention provide a control method for an image acquisition device, a control device therefor, and a storage medium, relate to the field of the image acquisition device, and aim to realize synchronization of an operation timing signal of the image acquisition device and an external trigger signal. The method comprises: receiving image data acquired by the image acquisition device; analyzing the image data, obtaining an image timing according to an analysis result, and determining a frame synchronization signal of the image data output by the image acquisition device according to the image timing; determining a phase offset between the frame synchronization signal and a preset trigger signal; and adjusting a phase of a control signal based on the phase offset, wherein the control signal is configured for adjusting an operation timing of the image acquisition device.

20 Claims, 6 Drawing Sheets

(58) Field of Classification Search
CPC ...... H04N 5/0733; H04N 23/73; H04N 23/71; H04N 23/76; H04N 23/60; H04N 23/90; H04N 23/45
See application file for complete search history.

(56) References Cited

U.S. PATENT DOCUMENTS

| | | | | |
|---|---|---|---|---|
| 2016/0198089 | A1* | 7/2016 | Motohashi | H04N 5/247 348/36 |
| 2016/0234437 | A1* | 8/2016 | Kuwada | H04N 5/235 |
| 2017/0214903 | A1 | 7/2017 | Tadano | |
| 2018/0288300 | A1* | 10/2018 | Crooks | H04N 5/2352 |
| 2019/0215420 | A1 | 7/2019 | Kaneko et al. | |
| 2019/0289172 | A1* | 9/2019 | Bangs | H04N 5/06 |
| 2021/0377424 | A1* | 12/2021 | Hanamoto | H04N 5/0733 |

FOREIGN PATENT DOCUMENTS

| | | |
|---|---|---|
| CN | 103957344 A | 7/2014 |
| CN | 103108125 A | 5/2015 |
| CN | 104601900 A | 5/2015 |
| CN | 106131407 A | 11/2016 |
| CN | 106165394 A | 11/2016 |
| CN | 108848354 A | 11/2018 |
| CN | 109302567 A | 2/2019 |
| CN | 109640051 A | 4/2019 |
| CN | 110248111 A | 9/2019 |
| CN | 111182226 A | 5/2020 |
| WO | 2018228352 A1 | 12/2018 |

OTHER PUBLICATIONS

Lorenzen, Thorsten et al. "Quad Channel Camera Application for Surround View and CMS Camera Systems", Texas Instruments, Application Report, SPRAC39A. Aug. 23, 2016, pp. 1-13.
European Application No. 21190167.3-1208, Extended European Search Report dated Dec. 7, 2021, pp. 1-12.
Chinese Patent Office, First Office Action for CN Appl. No 202010787944.3, dated Apr. 17, 2023, 27 pages with English translation.

* cited by examiner

CONTROL METHOD FOR IMAGE ACQUISITION DEVICE, CONTROL DEVICE THEREFOR, AND STORAGE MEDIUM

CROSS-REFERENCE TO RELATED APPLICATIONS

The present disclosure claims priority to Chinese Patent Application No. 202010787944.3, titled "CONTROL METHOD FOR IMAGE ACQUISITION DEVICE, CONTROL APPARATUS THEREOF AND CONTROL DEVICE THEREFOR, AND STORAGE MEDIUM", filed on Aug. 7, 2020, the content of which is incorporated herein by reference in its entirety.

TECHNICAL FIELD

The present invention relates to the field of an image acquisition device, and in particular, to a control method for an image acquisition device, a control device therefor, and a storage medium.

BACKGROUND

Image acquisition devices have been widely used in home scenes or workplaces, but some image acquisition devices without trigger (single frame trigger) function (such as some automotive grade image acquisition devices available from SONY corporation) cannot be synchronized with an external trigger signal in general, wherein the external trigger signal is an external signal received by a reserved port of the image acquisition device, which results in edge triggering or level triggering on the image acquisition device and thus forms the external trigger signal. Meanwhile, simultaneous exposure is also impossible when a plurality of image acquisition devices are linked.

In summary, an operation timing signal of the image acquisition device cannot be synchronized with the external trigger signal in the prior art.

SUMMARY

Embodiments of the present invention provide a control method for an image acquisition device, a control means thereof and a control device therefor, and a storage medium, and aim to realize synchronization of an operation timing signal of the image acquisition device and an external trigger signal.

In a first aspect, an embodiment of the present invention provides a control method for an image acquisition device comprising:

receiving image data acquired by the image acquisition device;

analyzing the image data, obtaining image timing according to an analysis result, and determining a frame synchronization signal of the image data output by the image acquisition device according to the image timing;

determining a phase offset between the frame synchronization signal and a preset trigger signal; and adjusting a phase of a control signal based on the phase offset, wherein the control signal is configured for adjusting an operation timing of the image acquisition device.

The control method for the image acquisition device provided by the embodiment of the present invention comprises: firstly receiving image data acquired by the image acquisition device, analyzing the image data, obtaining an image timing according to an analysis result, and determining a frame synchronization signal of the image data output by the image acquisition device according to the image timing; then determining a phase offset between the frame synchronization signal and a preset trigger signal; and finally adjusting a phase of a control signal based on the phase offset, wherein the control signal is configured for adjusting an operation timing of the image acquisition device. Compared with the prior art, the control method is characterized by that the triggering signal is compared with the image output timing of the image acquisition device to calculate the phase difference, the timing control of the image acquisition device is performed according to the comparison result, and the image acquisition device is provided with a timing adjusting signal pin so that the operation timing of the image acquisition device can be adjusted by adjusting the control signal, and the timing synchronization of the image output timing and the trigger signal is finally realized.

In one possible embodiment, adjusting the phase of the control signal based on the phase offset comprises:

adjusting the phase of the control signal using the phase offset when determining that image data output time of the image acquisition device is coincident with exposure start time of the image acquisition device.

In one possible embodiment, adjusting the phase of the control signal based on the phase offset further comprises:

determining a waiting duration between image data output time of the image acquisition device and exposure start time of the image acquisition device when determining that the image data output time is not coincident with the exposure start time; and adjusting the phase of the control signal using the phase offset, and advancing trigger time of the control signal by the waiting duration.

In one possible embodiment, adjusting the phase of the control signal using the phase offset comprises:

dividing the phase offset into a plurality of shifts smaller than a preset shift threshold, wherein the preset shift threshold is the maximum phase shift allowed by single adjustment; and adjusting the phase of the control signal in a gradually approaching manner based on the plurality of shifts smaller than the preset shift threshold.

In one possible embodiment, when a plurality of image acquisition devices are connected simultaneously and exposure durations of the plurality of image acquisition devices are different, the method further comprises:

receiving image brightness values sent by the plurality of image acquisition devices;

determining a uniform exposure duration of the plurality of image acquisition devices based on the image brightness values of the plurality of image acquisition devices;

determining a brightness gain of a target image acquisition device based on the uniform exposure duration and an image brightness value of the target image acquisition device, wherein the target image acquisition device is any one of the plurality of image acquisition devices; and configuring the brightness gain of the target image acquisition device to the target image acquisition device, and controlling the target image acquisition device to expose in the uniform exposure duration.

When a plurality of image acquisition devices are connected simultaneously and exposure durations of the plurality of image acquisition devices are different, the control method for the image acquisition device provided by the embodiment of the present invention further comprises: firstly receiving image brightness values sent by the plurality of image acquisition devices; then determining a uniform exposure duration of the plurality of image acquisition devices based on the image brightness values of the plurality of image acquisition devices, and determining a brightness gain of a target image acquisition device based on the uniform exposure duration and an image brightness value of the target image acquisition device, wherein the target image acquisition device is any one of the plurality of image acquisition devices; and finally configuring the brightness gain of the target image acquisition device to the target image acquisition device, and controlling the target image acquisition device to expose in the uniform exposure duration. Compared with the prior art, when a plurality of image acquisition devices are connected simultaneously, the control method of the present invention solves the problem that exposure can only start simultaneously while cannot end simultaneously due to different exposure durations of the plurality of image acquisition devices, and has advantages that synchronous exposure of the plurality of image acquisition devices is realized by configuring respective brightness gain and uniform exposure duration for each image acquisition device.

In one possible implementation, determining the brightness gain of the target image acquisition device based on the uniform exposure duration and the image brightness value of the target image acquisition device comprises:

performing a weighted sum on the image brightness values of the target image acquisition devices according to brightness weights preset by the target image acquisition devices, and dividing the weighted sum by a sum of brightness weights of the plurality of image acquisition devices to determine an average brightness value of the plurality of image acquisition device; and determining a brightness difference value between the image brightness value of the target image acquisition device and the average brightness value as the brightness gain of the target image acquisition device.

In a second aspect, an embodiment of the present invention provides a control means of an image acquisition device comprising:

a reception unit for receiving image data acquired by the image acquisition device;

an analysis unit for analyzing the image data, obtaining image timing according to an analysis result, and determining a frame synchronization signal of the image data output by the image acquisition device according to the image timing;

a determination unit for determining a phase offset between the frame synchronization signal and a preset trigger signal; and a control unit for adjusting a phase of a control signal based on the phase offset, wherein the control signal is configured for adjusting an operation timing of the image acquisition device.

In one possible embodiment, the control unit is specifically configured for:

adjusting the phase of the control signal using the phase offset when determining that image data output time of the image acquisition device is coincident with exposure start time of the image acquisition device.

In one possible embodiment, the control unit is further specifically configured for:

determining a waiting duration between image data output time of the image acquisition device and exposure start time of the image acquisition device when determining that the image data output time is not coincident with the exposure start time; and adjusting the phase of the control signal using the phase offset, and advancing trigger time of the control signal by the waiting duration.

In one possible embodiment, when a plurality of image acquisition devices are connected simultaneously and exposure durations of the plurality of image acquisition devices are different, the control means comprises a processing unit configured for:

receiving image brightness values sent by the plurality of image acquisition devices;

determining a uniform exposure duration of the plurality of image acquisition devices based on the image brightness values of the plurality of image acquisition devices;

determining a brightness gain of a target image acquisition device based on the uniform exposure duration and an image brightness value of the target image acquisition device, wherein the target image acquisition device is any one of the plurality of image acquisition devices; and configuring the brightness gain of the target image acquisition device to the target image acquisition device, and controlling the target image acquisition device to expose in the uniform exposure duration.

In one possible embodiment, the processing unit is specifically configured for:

performing a weighted sum on the image brightness values of the target image acquisition devices according to brightness weights preset by the target image acquisition devices, and dividing the weighted sum by a sum of brightness weights of the plurality of image acquisition devices to determine an average brightness value of the plurality of image acquisition device; and determining a brightness difference value between the image brightness value of the target image acquisition device and the average brightness value as the brightness gain of the target image acquisition device.

In a third aspect, an embodiment of the present invention further provides a control system for an image acquisition device comprising a main control module, and the image acquisition device, a cache module, a storage module, an interface module and a power module connected with the main control module, wherein the image acquisition device is configured for sending output image data to the main control module;

the main control module is configured for analyzing received image data, obtaining an image timing according to an analysis result, determining a frame synchronization signal of the image data output by the image acquisition device according to the image timing, determining a phase offset between the frame synchronization signal and a preset trigger signal, and adjusting a phase of a control signal based on the phase offset, wherein the control signal is configured for adjusting an operation timing of the image acquisition device;

the cache module is configured for caching boot codes applied in the main control module;

the storage module is configured for storing the image data processed in the main control module;

the interface module is configured for providing network communication for the main control module; and the power module is configured for supplying power to the image acquisition device and the main control module.

In one possible implementation, the control system further comprises:

a serializer and a deserializer connected between the image acquisition device and the main control module, wherein the serializer is configured for performing parallel-serial conversion on the image data output by the image acquisition device to generate serial data and sending the serial data to the deserializer, and the deserializer is configured for receiving the serial data sent by the serializer and performing serial-parallel conversion, and sending the converted image data to the main control module.

In a fourth aspect, an embodiment of the present invention further provides a control device for an image acquisition device comprising:

at least one processor, at least one memory, and computer program instructions stored in the memory that, when executed by the processor, implement the control method for an image acquisition device provided by the first aspect of the embodiment of the present invention.

In a fifth aspect, an embodiment of the present invention further provides a computer-readable storage medium having computer program instructions stored thereon that, when executed by a processor, enable the control device of an image acquisition device to implement the control method of an image acquisition device provided in the first aspect of the embodiment of the present invention.

BRIEF DESCRIPTION OF THE DRAWINGS

The above and other objects, features and advantages of exemplary embodiments of the present invention will be easily understood by reading the following detailed description with reference to the accompanying drawings. In the accompanying drawings, several embodiments of the present invention are illustrated by way of example and not limitation, wherein.

DETAILED DESCRIPTION

In view of the fact that image acquisition devices without trigger (single frame trigger) function (such as some automotive grade image acquisition devices available from SONY corporation) cannot be synchronized with an external trigger signal in the prior art, an embodiment of the present invention provides a control scheme for an image acquisition device, where a Field Programmable Gate Array (FPGA) is configured to control an interface timing of an image acquisition device without trigger function, and at the same time, the FPGA monitors the trigger signal, compares the trigger signal with an image output timing of the image acquisition device to calculate a phase difference, and performs timing control for the image acquisition device according to a comparison result, thereby achieving a function similar to the trigger function. The following describes a control method for an image acquisition device according to an embodiment of the present invention in detail with reference to the accompanying drawings and specific embodiments.

Further, the trigger signal must have a fixed frequency, and the frame rate of the image acquisition device is an integral multiple of the frequency, for example, the image acquisition device has a frame rate of 60 FPS, and the trigger signal has a stable frequency of 20 Hz. The precondition can be easily met in the fields of automatic driving, robots and the like, so the scheme provided in the embodiment of the present invention can also be generally applied in the fields of automatic driving, robots and the like.

Figure 1:
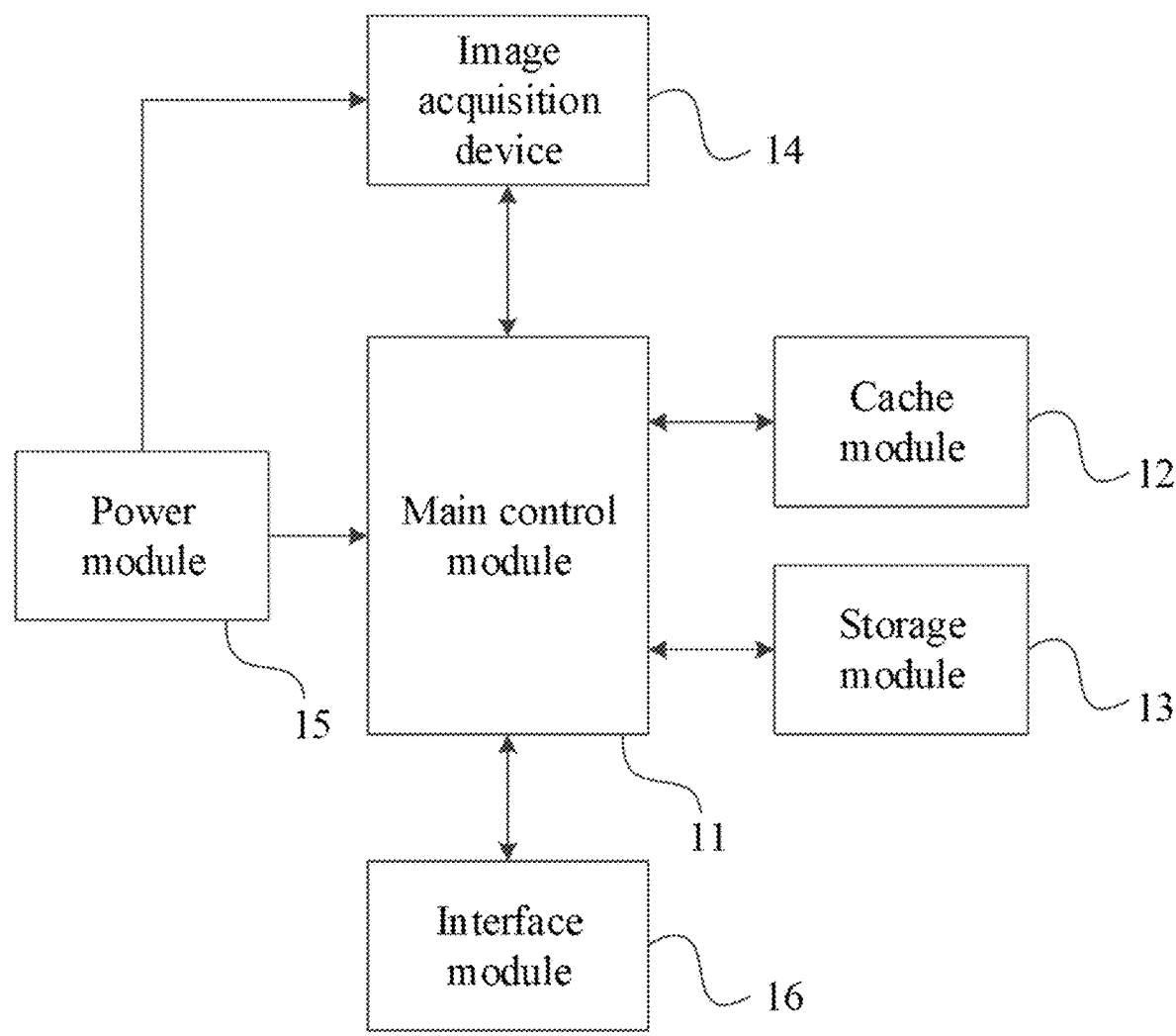
FIG. 1 is a schematic structural diagram of a control system for an image acquisition device according to an embodiment of the present invention.

FIG. 1 exemplarily illustrates a schematic structural diagram of a control system for an image acquisition device according to an embodiment of the present invention. As shown in FIG. 1, the system comprises a main control module 11, a cache module 12, a storage module 13, an image acquisition device 14, a power module 15, and an interface module 16.

The main control module is configured for receiving image data acquired by the image acquisition device and it may be a Field Programmable Gate Array (FPGA) or a System on Chip (SOC) with programmable logic; the cache module is configured for caching data when the system runs and it may be a Double Data Rate (DDR) memory; the storage module is configured for storing boot codes and it may be a serial peripheral interface flash (SPI flash), a Secure Digital Card (SD Card), a NOR flash, a NAND flash or an Embedded Multi Media Card (EMMC); the image acquisition device is configured for acquiring image data and an interface thereof may be a Mobile Industry Processor Interface (MIPI), a High-Speed Pixel Interface (HiSpi), or a Digital Video Port (DVP); the interface module may be a Gigabit Media Independent Interface (GMII) or a Reduced Gigabit Media Independent Interface (RGMII); there is no limitation for these things in the present invention.

Figure 2:
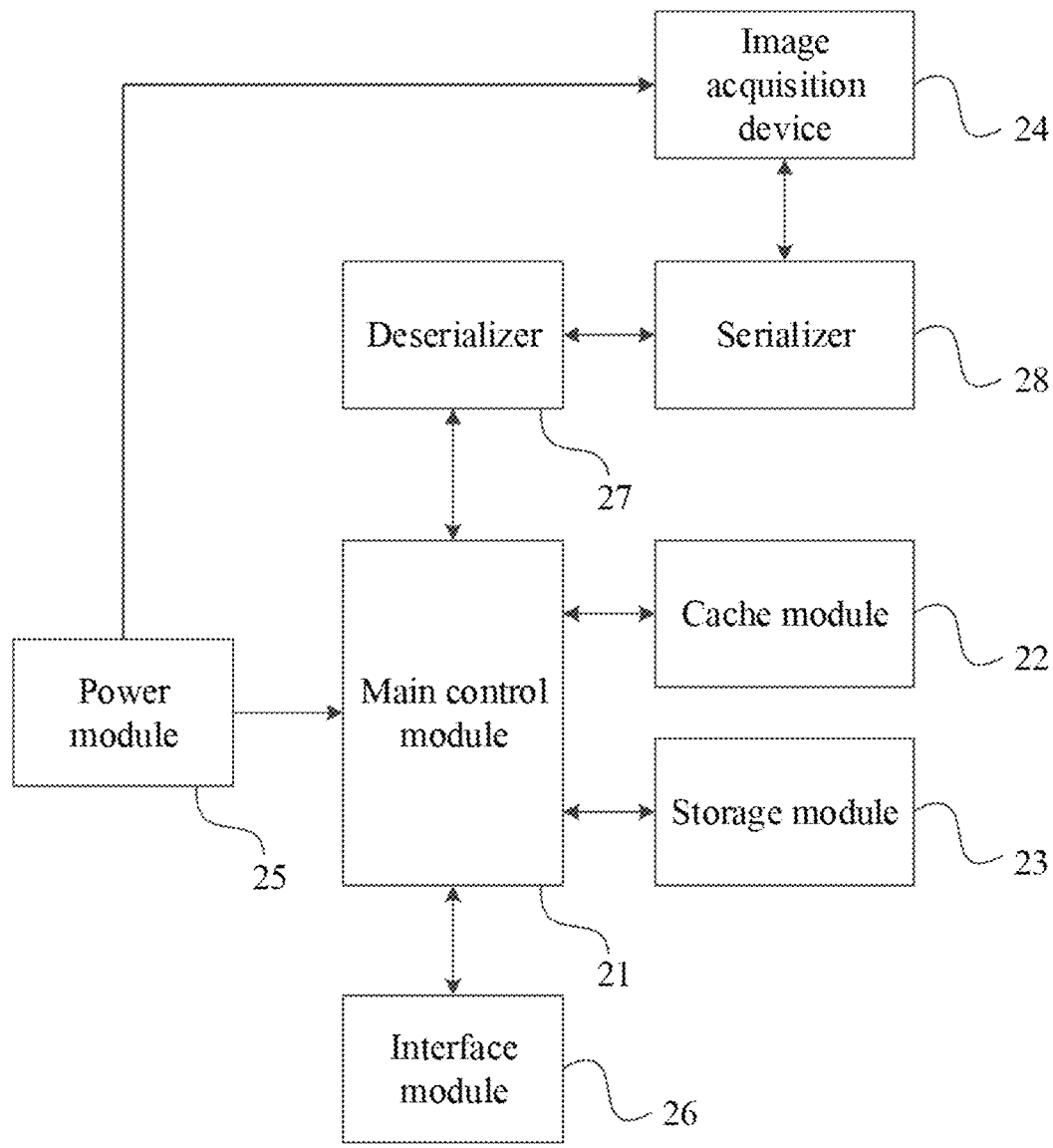
FIG. 2 is a schematic structural diagram of a control system for another image acquisition device according to an embodiment of the present invention.

FIG. 2 exemplarily illustrates a schematic structural diagram of another synchronization system for an image acquisition device according to an embodiment of the present invention. As shown in FIG. 2, the system comprises a main control module 21, a cache module 22, a storage module 23, an image acquisition device 24, a power module 25, an interface module 26, a deserializer 27, and a serializer 28.

An interface of the deserializer and the serializer may be an FPD LINK III interface (a bidirectional control interface), a GMSL (Gigabit Multimedia Serial Link)/GMSL2 interface or a V-BY-ONE interface (a digital interface developed specifically for image transmission), and there is no limitation for this in the present invention.

Further, what the image acquisition device does comprises exposing a photosensitive unit, and performing AD conversion on the photosensitive unit and outputting after some other processing; determination can only be made according to the timing of the received image because the main control module can only passively receive image data output by the image acquisition device, and there is a fixed (deviation, if present, is in ns level and can be ignored) time difference between the timing of the image received by the main control module and the operation timing of the image acquisition device so that the timing in the image acquisition device can be reversely deduced. Images output by either the MIPI interface or the DVP interface, or other interfaces, can recover the timing containing Vertical Synchronization (vsync) signal and Horizontal Synchronization (hsync) signal, where the vsync can be used to represent the start of a frame of image and the hsync can be used to indicate the start of a row of images.

Figure 3:
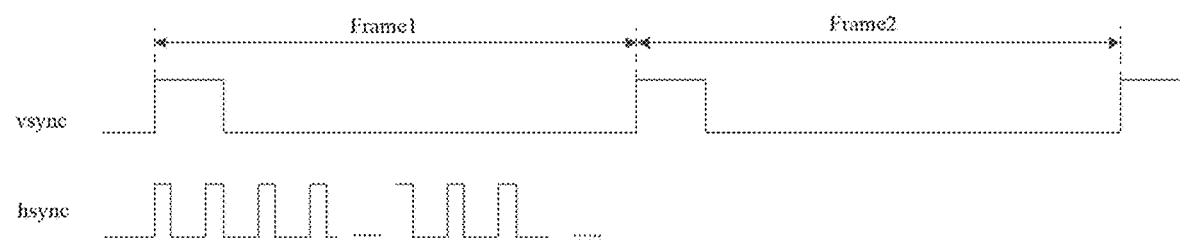
FIG. 3 is a signal timing diagram of a frame synchronization signal and a horizontal synchronization signal according to an embodiment of the present invention.
Figure 4:
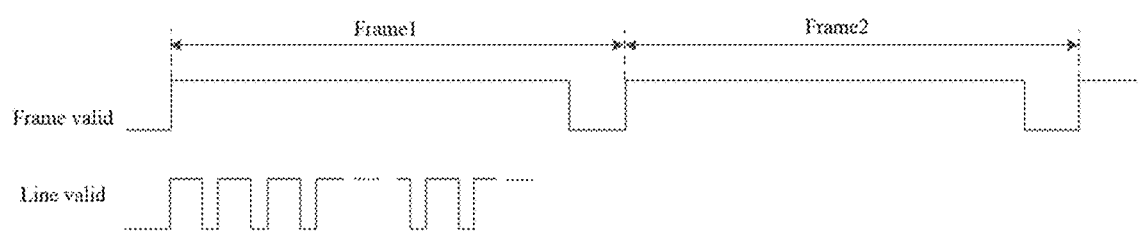
FIG. 4 is a signal timing diagram of another frame synchronization signal and a horizontal synchronization signal according to an embodiment of the present invention.

FIG. 3 is a signal timing diagram of a frame synchronization signal and a horizontal synchronization signal according to an embodiment of the present invention, and FIG. 4 is a signal timing diagram of another frame synchronization signal and a horizontal synchronization signal according to an embodiment of the present invention. Since there is a fixed time difference between a frame synchronization signal analyzed in the main control module and an internal operation timing of an image acquisition device, a timing of the image acquisition device can be determined by the frame synchronization signal.

Figure 5:
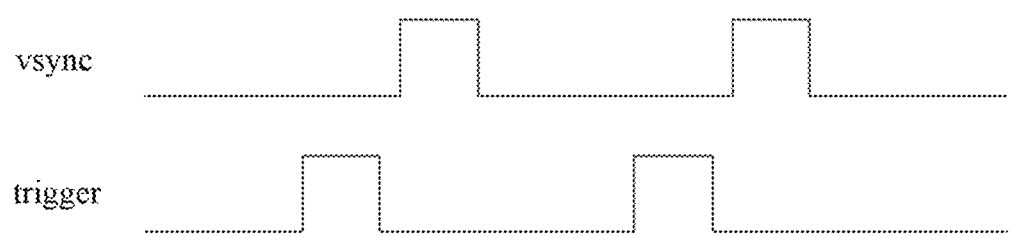
FIG. 5 is a signal timing diagram of a frame synchronization signal and a trigger signal according to an embodiment of the present invention.

Further, the frame synchronization signal plus a certain offset can represent the internal operation timing of the image acquisition device, therefore only the phase difference between the trigger (single frame trigger) signal and the frame synchronization signal needs to be monitored. As shown in FIG. 5, there is a fixed time difference between the trigger signal and the vsync signal, and the trigger signal is consistent with the internal operation timing signal of the image acquisition device.

Further, three schemes are provided below for how to control an image acquisition device and thereby to implement trigger synchronization, and detailed description is provided below with reference to specific embodiments.

Embodiment I

In one possible embodiment, some image acquisition devices have a timing adjustment signal frame synchronization (fsync) pin, which is for fine-tuning the operation timings of the image acquisition devices and thereby achieving synchronous output of data of multiple image acquisition devices. Because the control of data output of the image acquisition device will indirectly control the exposure timing of the image acquisition device, the timing of the fsync signal can be accurately controlled by the main control module, thereby gradually achieving a function similar to trigger.

It should be noted that, signal interaction may be directly performed between the image acquisition device and the main control module, or data of the image acquisition device may be sent to the main control module through the serializer and the deserializer, and meanwhile, the main control module sends a control signal to the image acquisition device through the deserializer and the serializer, and there is no limitation for this in the present invention.

When the fsync signal changes within a certain range, the image acquisition device can adjust its own operation timing to form a certain phase relationship with the fsync signal to keep synchronization. Therefore, a vsync signal analyzed from an image output by the image acquisition device can be compared with a trigger signal based on this characteristic, and the phase offset between the vsync signal and the trigger signal is determined according to the comparison result, thereby determining the phase change of the fsync signal, controlling the output of the fsync signal and finally realizing the control of the image timing of the image acquisition device.

Figure 6:
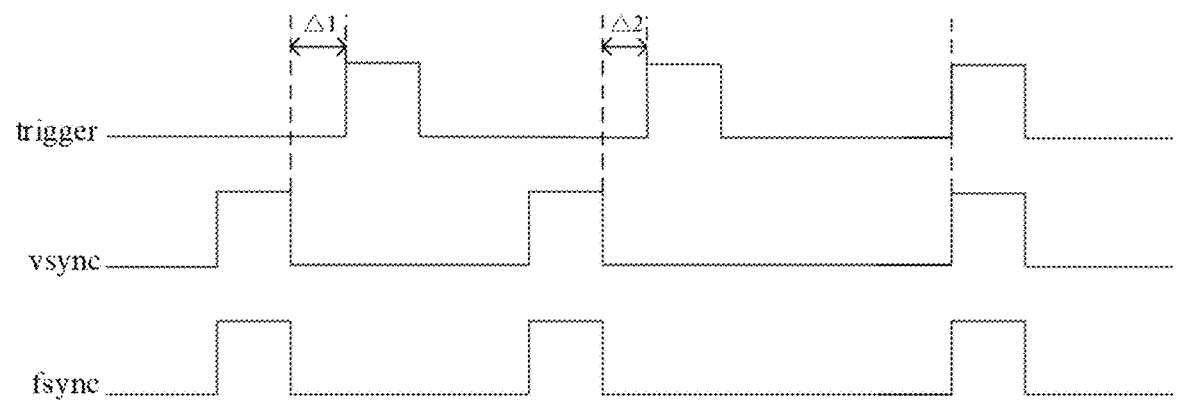
FIG. 6 is a schematic diagram illustrating adjustment of a phase of a control signal according to an embodiment of the present invention.

As shown in FIG. 6, the change range of the fsync signal received by some of the image acquisition devices cannot be too large, otherwise, the image acquisition device may operate abnormally, and therefore, a gradual approaching manner may be adopted for such image acquisition devices. In each frame, a certain value of phase is adjusted each time, and the phase cannot exceed the allowable change range of the image acquisition device. The fsync signal is synchronized with trigger signal by gradual adjustments of multiple frames. The trigger signal in FIG. 6 has a fixed frequency, and the alignment of the vsync signal with the trigger signal is controlled by adjusting the position of the fsync signal. Therefore, the image timing of the image acquisition device without trigger function can be synchronized with the external trigger signal with a fixed frequency, which comprises the following steps in specific implementation:

S1, receiving and analyzing, by a main control module, image data sent by the image acquisition device, obtaining an image timing and determining a vsync signal;

S2, comparing the vsync signal with the trigger signal, and determining a phase offset between the vsync signal and the trigger signal according to the comparison result; and S3, adjusting the phase of the fsync signal according to the phase offset determined in S2, and adjusting, by the image acquisition device, its own operation timing to form a certain phase relationship with the fsync signal to keep synchronization; therefore adjusting the phase of the fsync signal is equivalent to adjusting the operation timing of the image acquisition device.

In one possible embodiment, during the phase adjustment of the fsync, a maximum phase shift for a single adjustment of the fsync signal is preset by the image acquisition device, and the fsync signal gradually approaches based on the maximum phase shift until the adjustment of the phase offset is completed.

Therefore, the phase change of the fsync signal can cause the change of the operation timing inside the image acquisition device. When the main control module receives the image data sent by the image acquisition device again, the vsync signal also changes with the change of the operation timing since there is a fixed time difference between the vsync signal obtained by analyzing the image data and the internal operation timing of the image acquisition device, and the vsync signal is compared with the trigger signal again and the fsync signal is adjusted again according to the comparison result until the fsync signal is synchronized with the trigger signal, that is, the image timing of the image acquisition device is synchronized with the external trigger signal with a fixed frequency.

Embodiment II

In one possible embodiment, also for an image acquisition device without trigger function, the synchronization between the image timing and the trigger signal is realized after the synchronization in the Embodiment I is completed, that is, the trigger signal arrives, and the image acquisition device outputs the image data within an acceptable time difference; however, for some image acquisition devices, the image data output does not represent that the image acquisition device starts exposure because an SHS (a waiting duration) is present between the start of frame and the start of exposure, and the image acquisition device starts image output but does not start exposure when the trigger signal arrives so that there is a time difference between the trigger time of the trigger signal and the exposure start time.

Figure 7:
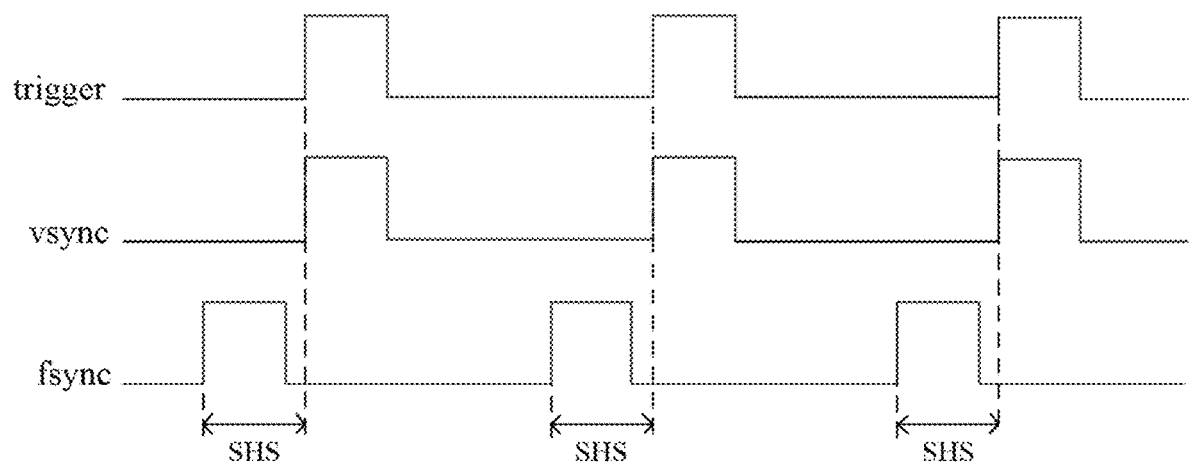
FIG. 7 is a schematic diagram illustrating adjustment of a phase of another control signal according to an embodiment of the present invention.

In specific implementation, as shown in FIG. 7, the frame rate per second is preset, and the duration of one frame can be obtained. The exposure duration is also preset in each frame, the exposure duration of the current image acquisition device can be obtained by an automatic exposure module, and the SHS time is obtained by subtracting the exposure duration from the duration of one frame. The frequency and the phase of the fsync signal can be obtained by the method in the Embodiment I, and then the fsync signal can be advanced by SHS duration; the image acquisition device triggers one frame in advance according to the fsync signal and starts exposure after the SHS duration passed, the exposure duration is consistent with the trigger signal, and the synchronization of image exposure and the trigger signal is achieved. In specific implementation, the following steps may be comprised:

S1, receiving and analyzing, by a main control module, image data sent by the image acquisition device, obtaining an image timing and determining a vsync signal;

S2, comparing the vsync signal with the trigger signal, and determining a phase offset between the vsync signal and the trigger signal according to the comparison result;

S3, obtaining, by the main control module, the exposure duration of the image acquisition device, obtaining the duration of one frame according to the preset frame rate, and determining SHS duration by calculating the difference between these two;

in specific implementation, the frame rate of the image acquisition device is preset, and the duration of one frame can be obtained; the exposure duration is also preset in each frame, so that the duration of one frame and the exposure duration of the current image acquisition device can be obtained by the main control module, and the SHS time is the difference between these two; and S4, adjusting the phase of the control signal using the phase offset according to the phase offset determined in S2 and the SHS duration determined in S3, and advancing the trigger time of the adjusted control signal by the SHS duration.

Embodiment III

Figure 8:
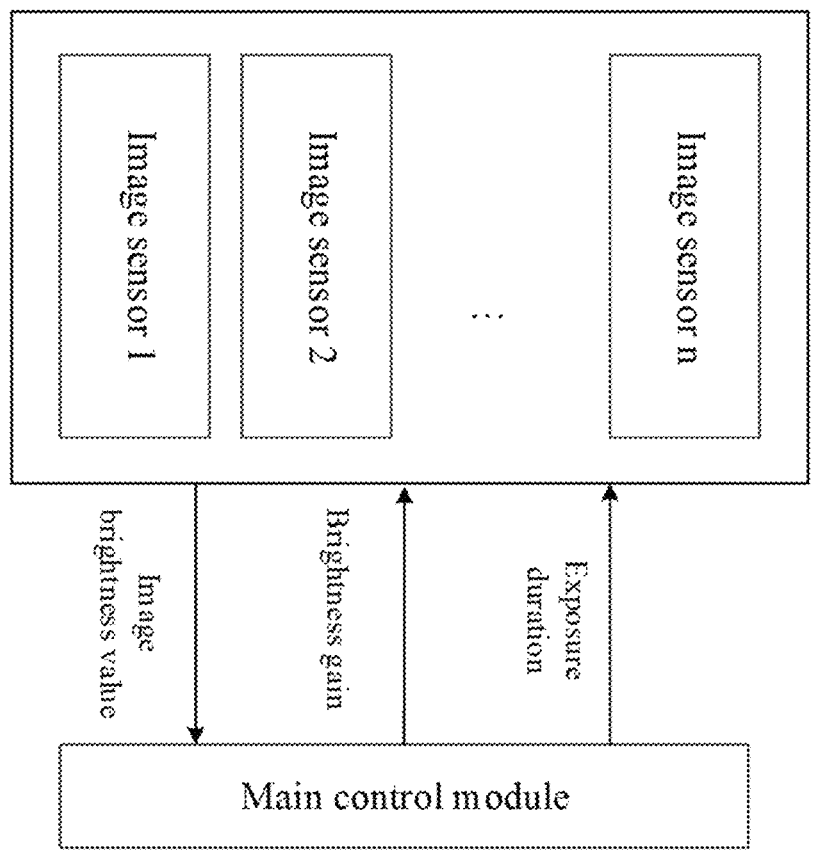
FIG. 8 is a schematic structural diagram of another control system for an image acquisition device according to an embodiment of the present invention.

FIG. 8 is a schematic structural diagram of another control system for an image acquisition device according to an embodiment of the present invention. In various machine vision applications, a plurality of image acquisition devices are required to simultaneously start exposure and simultaneously end exposure; however, in actual application, it is possible to start exposure simultaneously upon the arrival of the trigger signal due to the necessity of starting the automatic exposure algorithm, but ending the exposure simultaneously cannot be achieved. For example, in an autonomous vehicle, the image acquisition devices facing the front of the vehicle is exposed to stronger light, and the image acquisition devices facing two sides of the vehicle are exposed to weaker light. In this case, longer exposure duration is set for the image acquisition devices on two sides of the vehicle, and shorter exposure duration is set for the image acquisition devices in the front of the vehicle. Thus, if the same fsync signal is used, some image acquisition devices will end exposure early, and some later. Therefore, an embodiment of the present invention provides a linkage scheme of a plurality of image acquisition devices, which can realize that the plurality of image acquisition devices start exposure simultaneously and end exposure simultaneously.

In specific implementation, the linkage scheme comprises the following steps:

S1, setting a brightness weight for each image acquisition device;

in specific implementation, the brightness weight of the image acquisition device can be set according to the light intensity around the image acquisition device, for example, the brightness weight of the image acquisition device in the front of the vehicle can be set to 1 if the light intensity around the image acquisition device is strong and the light is sufficient; the brightness weight of the image acquisition devices on two sides of the vehicle can be set to 0.8 if the light intensity around the image acquisition devices are weak;

S2, dynamically sending at each frame, by the linked image acquisition devices, the image brightness value counted by the linked image acquisition devices to a main control module;

S3, determining, by the main control module, an appropriate exposure duration according to the image brightness values of all the image acquisition devices, that is, the exposure durations of the linked image acquisition devices are the same;

in specific implementation, overall brightness values corresponding to a plurality of different scenes can be preset, and each overall brightness value corresponds to a preset exposure duration;

further, the overall brightness value may be a brightness value for a specific image acquisition device, or may be an average brightness value of the values for a plurality of image acquisition devices, and there is no limitation for this in the present invention;

S4, determining a brightness gain of each image acquisition device according to the image brightness value of each image acquisition device and the corresponding brightness weight;

in specific implementation, the weighted sum may be performed on the image brightness values of the plurality of image acquisition devices based on the brightness weights corresponding to the image brightness values, then an average brightness value is obtained by dividing the weighted sum by a sum of brightness weights of the plurality of image acquisition devices, and the image brightness value of each image acquisition device is compared with the average brightness value to obtain a brightness difference value of each image acquisition device, which is determined as the brightness gain of each image acquisition device;

S5, sending the exposure duration to all linked image acquisition devices, and sending different brightness gains to the corresponding image acquisition device; and S6, in the case that the exposure durations of the plurality of image acquisition devices are the same, for the image acquisition device receiving weak light, the same exposure duration can be realized by increasing the brightness gain, that is, the brightness gain is adjusted to compensate the exposure duration; meanwhile, for the image acquisition device receiving strong light, the same exposure duration can be realized by reducing the brightness gain, that is, the brightness gain is adjusted to reduce the exposure duration.

In one possible embodiment, in order to ensure that better image quality can be realized with the premise that a plurality of image acquisition devices can start exposure simultaneously and end exposure simultaneously, at least one third of the field of view of each of the image acquisition devices linked together is required to be overlapped with one another.

Figure 9:
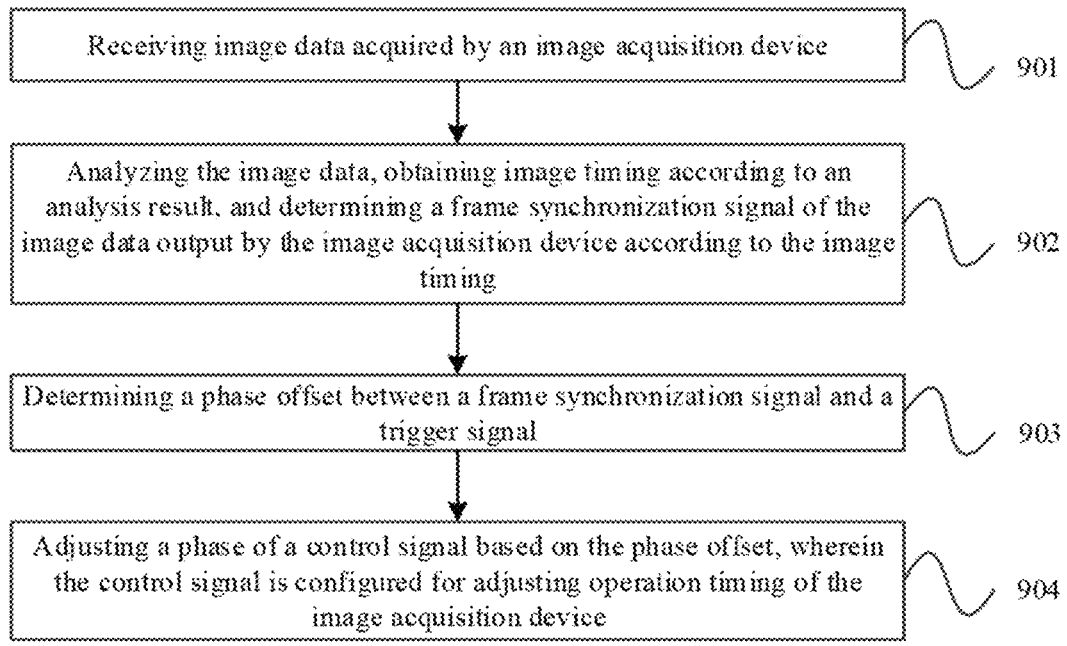
FIG. 9 is a schematic flowchart of a control method for an image acquisition device according to an embodiment of the present invention.

As shown in FIG. 9, an embodiment of the present invention provides a control method for an image acquisition device comprising:

Step 901, receiving image data acquired by the image acquisition device;

Step 902, analyzing the image data, obtaining image timing according to an analysis result, and determining a frame synchronization signal of the image data output by the image acquisition device according to the image timing;

Step 903: determining a phase offset between the frame synchronization signal and a preset trigger signal; and Step 904: adjusting a phase of a control signal based on the phase offset, wherein the control signal is configured for adjusting an operation timing of the image acquisition device.

In one possible embodiment, adjusting the phase of the control signal based on the phase offset comprises:

adjusting the phase of the control signal using the phase offset when determining that image data output time of the image acquisition device is coincident with exposure start time of the image acquisition device.

In one possible embodiment, adjusting the phase of the control signal based on the phase offset further comprises:

determining a waiting duration between image data output time of the image acquisition device and exposure start time of the image acquisition device when determining that the image data output time is not coincident with the exposure start time; and adjusting the phase of the control signal using the phase offset, and advancing trigger time of the control signal by the waiting duration.

In one possible embodiment, adjusting the phase of the control signal using the phase offset comprises:

dividing the phase offset into a plurality of shifts smaller than a preset shift threshold, wherein the preset shift threshold is the maximum phase shift allowed by single adjustment; and adjusting the phase of the control signal in a gradually approaching manner based on the plurality of shifts smaller than the preset shift threshold.

In one possible embodiment, when a plurality of image acquisition devices are connected simultaneously and exposure durations of the plurality of image acquisition devices are different, the method further comprises:

receiving image brightness values sent by the plurality of image acquisition devices;

determining a uniform exposure duration of the plurality of image acquisition devices based on the image brightness values of the plurality of image acquisition devices;

determining a brightness gain of a target image acquisition device based on the uniform exposure duration and an image brightness value of the target image acquisition device, wherein the target image acquisition device is any one of the plurality of image acquisition devices; and configuring the brightness gain of the target image acquisition device to the target image acquisition device, and controlling the target image acquisition device to expose in the uniform exposure duration.

In one possible implementation, determining the brightness gain of the target image acquisition device based on the uniform exposure duration and the image brightness value of the target image acquisition device comprises:

performing a weighted sum on the image brightness values of the target image acquisition devices according to brightness weights preset by the target image acquisition devices, and dividing the weighted sum by a sum of brightness weights of the plurality of image acquisition devices to determine an average brightness value of the plurality of image acquisition device; and determining a brightness difference value between the image brightness value of the target image acquisition device and the average brightness value as the brightness gain of the target image acquisition device.

Figure 10:
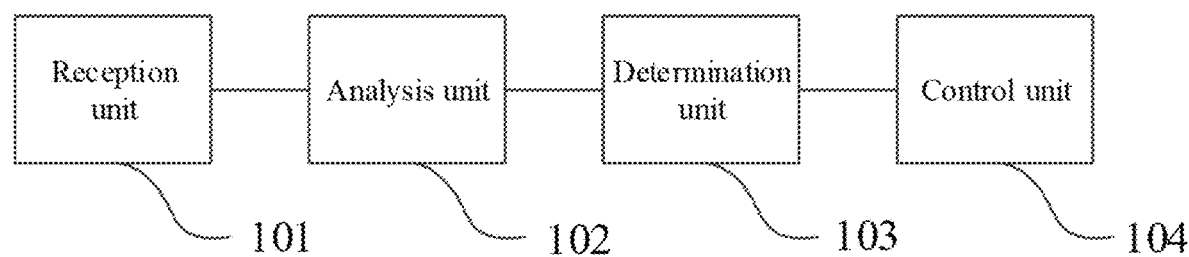
FIG. 10 is a schematic structural diagram of a control means of an image acquisition device according to an embodiment of the present invention.

As shown in FIG. 10, an embodiment of the present invention provides a control means of an image acquisition device comprising:

a reception unit 101 for receiving image data acquired by the image acquisition device;

an analysis unit 102 for analyzing the image data, obtaining image timing according to an analysis result, and determining a frame synchronization signal of the image data output by the image acquisition device according to the image timing;

a determination unit 103 for determining a phase offset between the frame synchronization signal and a preset trigger signal; and a control unit 104 for adjusting a phase of a control signal based on the phase offset, wherein the control signal is configured for adjusting an operation timing of the image acquisition device.

In one possible embodiment, the control unit 104 is specifically configured for:

adjusting the phase of the control signal using the phase offset when determining that image data output time of the image acquisition device is coincident with exposure start time of the image acquisition device.

In one possible embodiment, the control unit 104 is further specifically configured for:

determining a waiting duration between image data output time of the image acquisition device and exposure start time of the image acquisition device when determining that the image data output time is not coincident with the exposure start time; and adjusting the phase of the control signal using the phase offset, and advancing trigger time of the control signal by the waiting duration.

In one possible embodiment, when a plurality of image acquisition devices are connected simultaneously and exposure durations of the plurality of image acquisition devices are different, the control means comprises a processing unit 105 configured for:

receiving image brightness values sent by the plurality of image acquisition devices;

determining a uniform exposure duration of the plurality of image acquisition devices based on the image brightness values of the plurality of image acquisition devices;

determining a brightness gain of a target image acquisition device based on the uniform exposure duration and an image brightness value of the target image acquisition device, wherein the target image acquisition device is any one of the plurality of image acquisition devices; and configuring the brightness gain of the target image acquisition device to the target image acquisition device, and controlling the target image acquisition device to expose in the uniform exposure duration.

In one possible embodiment, the processing unit 105 is specifically configured for:

performing a weighted sum on the image brightness values of the target image acquisition devices according to brightness weights preset by the target image acquisition devices, and dividing the weighted sum by a sum of brightness weights of the plurality of image acquisition devices to determine an average brightness value of the plurality of image acquisition device; and determining a brightness difference value between the image brightness value of the target image acquisition device and the average brightness value as the brightness gain of the target image acquisition device.

Based on the same conception of the embodiment of the present invention described above, an embodiment of the present invention further provides a control device for an image acquisition device.

An embodiment of the present invention further provides a control system for an image acquisition device comprising a main control module, and the image acquisition device, a cache module, a storage module, an interface module and a power module connected with the main control module, wherein the image acquisition device is configured for sending output image data to the main control module;

the main control module is configured for analyzing received image data, obtaining an image timing according to an analysis result, determining a frame synchronization signal of the image data output by the image acquisition device according to the image timing, determining a phase offset between the frame synchronization signal and a preset trigger signal, and adjusting a phase of a control signal based on the phase offset, wherein the control signal is configured for adjusting an operation timing of the image acquisition device;

the cache module is configured for caching boot codes applied in the main control module;

the storage module is configured for storing the image data processed in the main control module;

the interface module is configured for providing network communication for the main control module; and the power module is configured for supplying power to the image acquisition device and the main control module.

In one possible implementation, the control system further comprises:

a serializer and a deserializer connected between the image acquisition device and the main control module, wherein the serializer is configured for performing parallel-serial conversion on the image data output by the image acquisition device to generate serial data and sending the serial data to the deserializer, and the deserializer is configured for receiving the serial data sent by the serializer and performing serial-parallel conversion, and sending the converted image data to the main control module.

Figure 11:
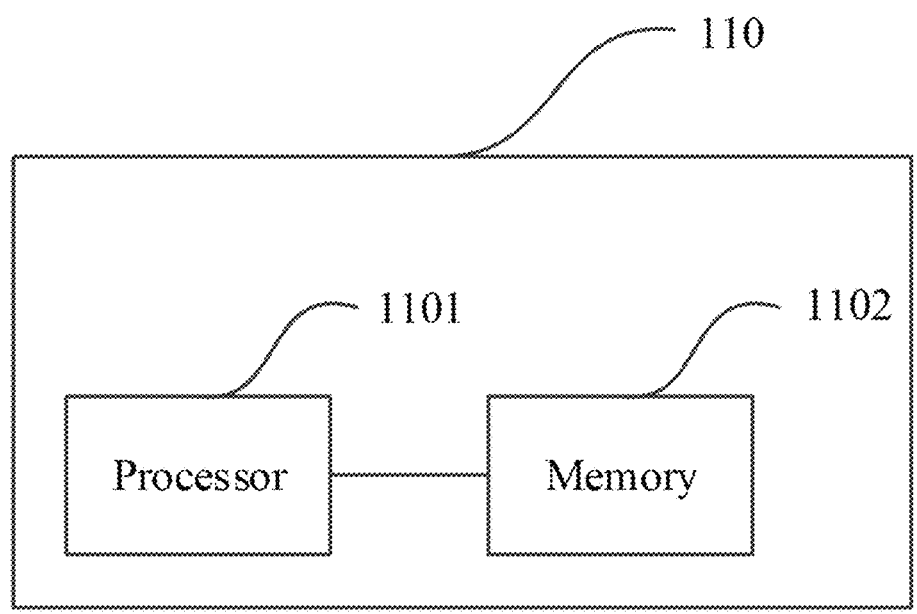
FIG. 11 is a schematic structural diagram of a control device for an image acquisition device according to an embodiment of the present invention.

As shown in FIG. 11, an embodiment of the present invention provides a control means 110 of an image acquisition device comprising:

at least one processor 1101, at least one memory 1102, and computer program instructions stored in the memory that, when executed by the processor 1101, implement the control method for an image acquisition device provided by the embodiment of the present invention.

In an exemplary embodiment, provided is a storage medium comprising instructions, for example, a memory 1102 comprising instructions that can be executed by a processor 1101 of a control device of an image acquisition device to implement the above method.

Optionally, the storage medium may be a non-transitory computer-readable storage medium, for example, the non-transitory computer-readable storage medium may be a ROM, a Random Access Memory (RAM), a CD-ROM, a magnetic tape, a floppy disk, an optical data storage device, and the like.

It should be appreciated by those skilled in the art that embodiments of the present application may be provided as a method, a system, or a computer program product. Accordingly, the present application may take the forms of a hardware-only embodiment, a software-only embodiment or an embodiment combining software and hardware. Furthermore, the present application may take the form of a computer program product implemented on one or more computer-usable storage media (including, but not limited to, disk memory, CD-ROM, optical memory, and the like) containing computer-usable program codes.

The present application is described with reference to flowcharts and/or block diagrams of a method, a device (system), and a computer program product according to the present application. It will be understood that each step and/or block of the flowcharts and/or block diagrams, and a combination of steps and/or blocks in the flowcharts and/or block diagrams, can be implemented by computer program instructions. These computer program instructions may be provided to a processor of a general-purpose computer, a dedicated computer, an embedded processor, or other programmable data processing device to produce a machine, such that the instructions executed by the processor of the computer or other programmable data processing devices produce a means for implementing the functions specified in one or more steps in the flowcharts and/or one or more blocks of block diagrams.

These computer program instructions may also be stored in a computer-readable memory that can direct a computer or other programmable data processing devices to operate in a particular manner, such that the instructions stored in the computer-readable memory produce a product comprising an instruction means which implements the functions specified in one or more steps in the flowcharts and/or one or more blocks of block diagrams.

These computer program instructions may also be loaded onto a computer or other programmable data processing devices to allow a series of operation steps to be performed on the computer or other programmable apparatus to produce a computer implemented process, such that the instructions executed on the computer or other programmable devices provide steps for implementing the functions specified in one or more steps in the flowcharts and/or one or more blocks of block diagrams.

It will be apparent to those skilled in the art that various changes and modifications may be made to the present application without departing from the spirit and scope of the present application. Thus, if such modifications and variations of the present application fall within the scope of the claims of the present application and the equivalents thereof, the present application is intended to include such modifications and variations as well.

What is claimed is:

1. A method, comprising:
receiving image brightness values from a plurality of image acquisition devices;
performing a weighted summation on the image brightness values of the plurality of image acquisition devices according to brightness weights preset by the plurality of image acquisition devices, to obtain a weighted sum value;
dividing the weighted sum value by a sum of the brightness weights preset by the plurality of image acquisition devices to determine an average brightness value of the plurality of image acquisition device;

determining a brightness difference value between the image brightness value of an image acquisition device of the plurality of image acquisition devices and the average brightness value as a brightness gain of the image acquisition device; and configuring the image acquisition device with the brightness gain.

2. The method according to claim 1, further comprising:
receiving image data acquired by the image acquisition device;
analyzing the image data, to obtain an analysis result;
obtaining an image timing according to the analysis result;
determining a frame synchronization signal with which the image acquisition device outputs the image data according to the image timing;
determining a phase offset between the frame synchronization signal and a preset trigger signal; and
adjusting a phase of a control signal based on the phase offset.

3. The method according to claim 2, wherein the adjusting the phase of the control signal based on the phase offset comprises:
adjusting the phase of the control signal using the phase offset in response to image data output time of the image acquisition device being coincident with exposure start time of the image acquisition device.

4. The method according to claim 3, wherein the adjusting the phase of the control signal using the phase offset comprises:
dividing the phase offset into a plurality of shifts smaller than a preset shift threshold, wherein the preset shift threshold is a maximum phase shift allowed by a single adjustment; and
adjusting the phase of the control signal in a gradually approaching manner based on the plurality of shifts.

5. The method according to claim 2, wherein the adjusting the phase of the control signal based on the phase offset comprises:
determining a waiting duration between image data output time of the image acquisition device and exposure start time of the image acquisition device in response to the image data output time being not coincident with the exposure start time;
adjusting the phase of the control signal using the phase offset; and
advancing trigger time of the control signal by the waiting duration.

6. The method according to claim 5, wherein the adjusting the phase of the control signal using the phase offset comprises:
dividing the phase offset into a plurality of shifts smaller than a preset shift threshold, wherein the preset shift threshold is the maximum phase shift allowed by a single adjustment; and
adjusting the phase of the control signal in a gradually approaching manner based on the plurality of shifts.

7. The method according to claim 1, further comprising:
in response to exposure durations of the plurality of image acquisition devices being different with each other:
determining a uniform exposure duration of the plurality of image acquisition devices based on the image brightness values; and
controlling the image acquisition device to expose in the uniform exposure duration.

8. A device, comprising at least one processor, at least one memory, and computer program instructions stored in the at least one memory that, when executed by the processor, implement a method comprising:
receiving image brightness values from a plurality of image acquisition devices;
performing a weighted summation on the image brightness values of the plurality of image acquisition devices according to brightness weights preset by the plurality of image acquisition devices, to obtain a weighted sum value;
dividing the weighted sum value by a sum of the brightness weights preset by the plurality of image acquisition devices to determine an average brightness value of the plurality of image acquisition device;
determining a brightness difference value between the image brightness value of an image acquisition device of the plurality of image acquisition devices and the average brightness value as a brightness gain of the target image acquisition device; and
configuring the image acquisition device with the brightness gain.

9. The device according to claim 8, wherein the method further comprises:
receiving image data acquired by the image acquisition device;
analyzing the image data, to obtain an analysis result;
obtaining image timing according to the analysis result;
determining a frame synchronization signal with which the image acquisition device outputs the image data according to the image timing;
determining a phase offset between the frame synchronization signal and a preset trigger signal; and
adjusting a phase of a control signal based on the phase offset.

10. The device according to claim 9, wherein the adjusting the phase of the control signal based on the phase offset comprises:
adjusting the phase of the control signal using the phase offset in response to image data output time of the image acquisition device being coincident with exposure start time of the image acquisition device.

11. The device according to claim 10, wherein the adjusting the phase of the control signal using the phase offset comprises:
dividing the phase offset into a plurality of shifts smaller than a preset shift threshold, wherein the preset shift threshold is a maximum phase shift allowed by a single adjustment; and
adjusting the phase of the control signal in a gradually approaching manner based on the plurality of shifts.

12. The device according to claim 9, wherein the adjusting the phase of the control signal based on the phase offset comprises:
determining a waiting duration between image data output time of the image acquisition device and exposure start time of the image acquisition device in response to the image data output time being not coincident with the exposure start time;
adjusting the phase of the control signal using the phase offset; and
advancing trigger time of the control signal by the waiting duration.

13. The device according to claim 12, wherein the adjusting the phase of the control signal using the phase offset comprises:

dividing the phase offset into a plurality of shifts smaller than a preset shift threshold, wherein the preset shift threshold is the maximum phase shift allowed by a single adjustment; and adjusting the phase of the control signal in a gradually approaching manner based on the plurality of shifts.

14. The device according to claim 8, wherein the method further comprises:

in response to exposure durations of the plurality of image acquisition devices being different with each other:

determining a uniform exposure duration of the plurality of image acquisition devices based on the image brightness values; and controlling the image acquisition device to expose in the uniform exposure duration.

15. A non-transitory computer-readable storage medium having computer program instructions stored thereon that, when executed by a processor, implement a method comprising:

receiving image brightness values from a plurality of image acquisition devices;

performing a weighted summation on the image brightness values of the plurality of image acquisition devices according to brightness weights preset by the plurality of image acquisition devices, to obtain a weighted sum value;

dividing the weighted sum value by a sum of the brightness weights preset by the plurality of image acquisition devices to determine an average brightness value of the plurality of image acquisition device;

determining a brightness difference value between the image brightness value of an image acquisition device of the plurality of image acquisition devices and the average brightness value as a brightness gain of the image acquisition device; and configuring the image acquisition device with the brightness gain.

16. The non-transitory computer-readable storage medium according to claim 15, wherein the method further comprises:

receiving image data acquired by the image acquisition device;

analyzing the image data, to obtain an analysis result;

obtaining image timing according to the analysis result;

determining a frame synchronization signal with which the image acquisition device outputs the image data according to the image timing;

determining a phase offset between the frame synchronization signal and a preset trigger signal; and adjusting a phase of a control signal based on the phase offset.

17. The non-transitory computer-readable storage medium according to claim 16, wherein the adjusting the phase of the control signal based on the phase offset comprises:

adjusting the phase of the control signal using the phase offset in response to image data output time of the image acquisition device being coincident with exposure start time of the image acquisition device.

18. The non-transitory computer-readable storage medium according to claim 16, wherein the adjusting the phase of the control signal based on the phase offset comprises:

determining a waiting duration between image data output time of the image acquisition device and exposure start time of the image acquisition device in response to the image data output time being not coincident with the exposure start time;

adjusting the phase of the control signal using the phase offset; and advancing trigger time of the control signal by the waiting duration.

19. The non-transitory computer-readable storage medium according to claim 18, wherein the adjusting the phase of the control signal using the phase offset comprises:

dividing the phase offset into a plurality of shifts smaller than a preset shift threshold, wherein the preset shift threshold is the maximum phase shift allowed by single adjustment; and adjusting the phase of the control signal in a gradually approaching manner based on the plurality of shifts.

20. The non-transitory computer-readable storage medium according to claim 15, wherein the method further comprises:

in response to exposure durations of the plurality of image acquisition devices being different with each other:

determining a uniform exposure duration of the plurality of image acquisition devices based on the image brightness values; and controlling the image acquisition device to expose in the uniform exposure duration.

\* \* \* \* \*

UNITED STATES PATENT AND TRADEMARK OFFICE
CERTIFICATE OF CORRECTION

| | | |
|---|---|---|
| PATENT NO. | : 11,706,533 B2 | |
| APPLICATION NO. | : 17/395655 | |
| DATED | : July 18, 2023 | |
| INVENTOR(S) | : Yu Zhang et al. | |

It is certified that error appears in the above-identified patent and that said Letters Patent is hereby corrected as shown below:

On the Title Page

On Page 2, item (56), under "OTHER PUBLICATIONS", in Column 2, Line 6, delete "No" and insert -- No. --, therefor.

In the Claims

In Column 16, Line 21, in Claim 8, delete "target image" and insert -- image --, therefor.

Signed and Sealed this
Nineteenth Day of September, 2023

Katherine Kelly Vidal
*Director of the United States Patent and Trademark Office*